R. COBB.
Hay Loader.
No. 51,294. Patented Dec. 5, 1865.
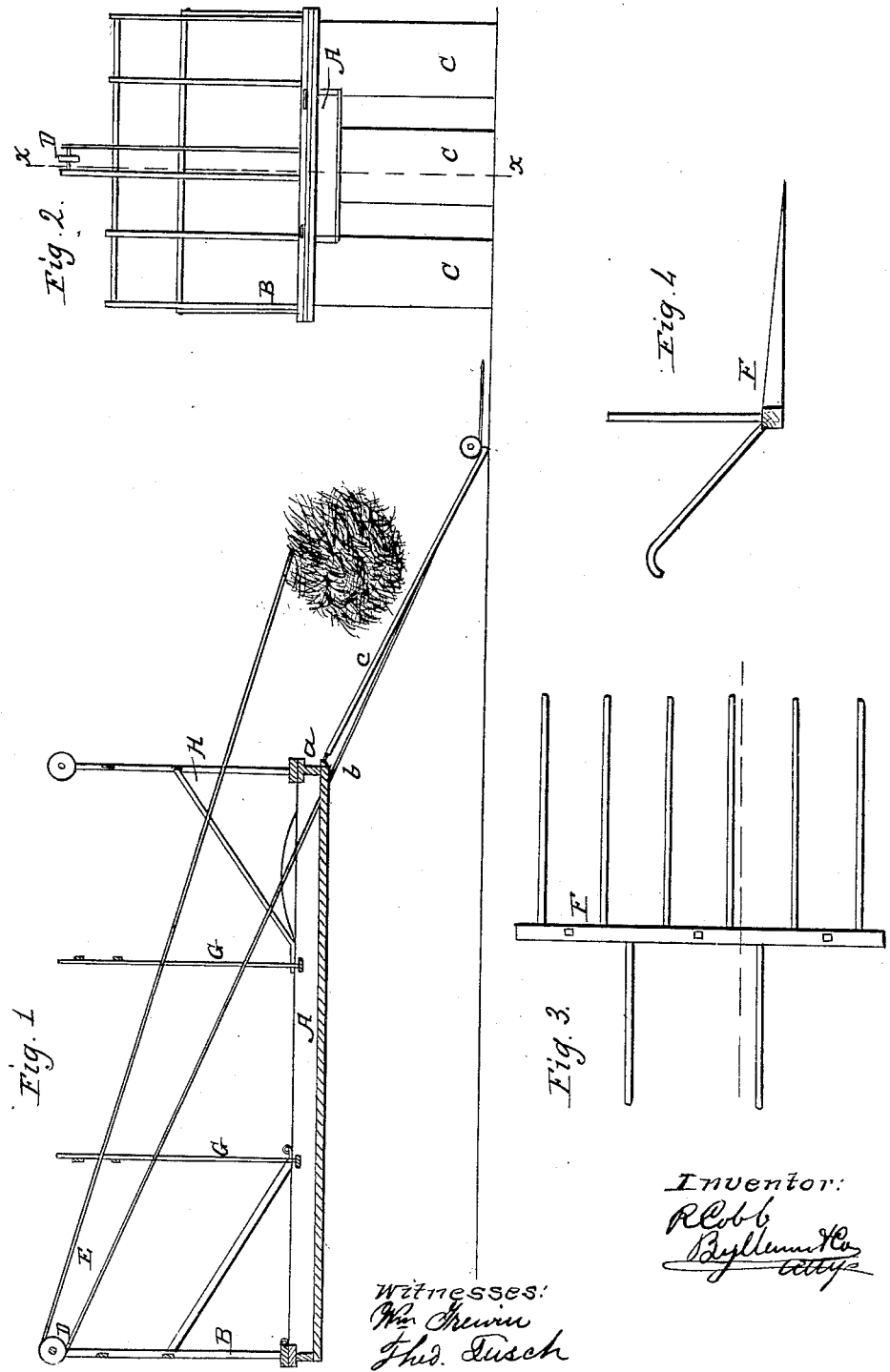

UNITED STATES PATENT OFFICE.

RUSSELL COBB, OF HADLEY, MICHIGAN.

IMPROVEMENT IN MEANS FOR LOADING HAY.

Specification forming part of Letters Patent No. 51,294, dated December 5, 1865.

*To all whom it may concern:*

Be it known that I, RUSSELL COBB, of Hadley, in the county of Lapeer and State of Michigan, have invented a new and useful Improvement in Loading and Unloading Hay and Grain; and I do hereby declare that the following is a full, clear, and exact description thereof, which will enable those skilled in the art to make and use the same, reference being had to the accompanying drawings, forming part of this specification, in which—

Figure 1 is a side sectional view of a hay-rake designed to be used in connection with my invention, $x\ x$, Fig. 2, indicating the line of section; Fig. 2, a rear view of the same; Fig. 3, a detached plan or top view of a hay-rake used in connection with the invention; Fig. 4, a side sectional view of Fig. 3.

Similar letters of reference indicate corresponding parts.

This invention relates to a new and useful improvement in loading and unloading hay and grain, designed to be used in connection with a hay and grain rack.

The object of the invention is to avoid the comparatively tedious operation of loading and unloading by hand; and it consists in the employment or use of removable inclined planes and a tackle applied to the hay and grain rack, in the manner substantially as hereinafter set forth.

A represents a grain-rack, provided with an upright frame, B, at its front end. At the rear end of the rack A there are hooks $a$, on which eyes $b$ at one end of boards C are fitted when the rack is to be loaded. These boards C form inclined planes, the lower ends resting upon the ground, as shown in Fig. 1.

On the front upright, B, of the rack there is a pulley, D, over which a rope, E, passes.

The hay or grain to be loaded on the rack is gathered either from the cock or from the windrow by means of a horse-rake, F, of any proper construction, and the rake-loads are deposited on the ground at the rear end of the wagon on which the rack A is placed. These rake-loads or bundles of hay are then bound with a double rope in the form commonly termed a "sling," and the latter is secured to the rope E, which has the team attached to it, and the bundles are drawn up the inclined plane and upon the rack, the rope E, as the bundles are drawn up, having a tendency to draw the slings tightly around the bundles. This operation is repeated until the rack is loaded.

The rack may be unloaded by drawing the bundles off from the rack, a bundle at a time, the ropes remaining on the bundles in order to admit of this being done, the tackle-rope E in the unloading process being attached directly to the ropes of the bundles.

G represents partitions, which are placed transversely in the rack in such a manner that they may be applied and removed at pleasure, and H is a frame fitted on the rack at the end opposite to where the frame B is applied. These partitions are designed to be used when it is necessary or desired to load the rack with unbound grain, the partitions dividing the rack into compartments, in which the grain is compactly retained and allowed to be removed a compartment at a time and by the tackle now employed in unloading hay. Thus by this arrangement a great saving in labor is effected.

Having thus described my invention, I claim as new and desire to secure by Letters Patent—

1. The inclined planes C, in combination with the tackle composed of the rope E and pulley D, applied to the rack A of a wagon, substantially as and for the purpose herein set forth.

2. The employment or use of partition G, when used in connection with the rack A, substantially as and for the purpose specified.

RUSSELL COBB.

Witnesses:
GEORGE A. WILLIAMS,
MORRIS S. JEFFERY,